United States Patent
Souri et al.

(10) Patent No.: US 7,549,530 B2
(45) Date of Patent: Jun. 23, 2009

(54) PIN TIP ATTACHMENT STRUCTURE OF CONVEYOR CHAIN FOR CAN MAKING

(75) Inventors: Yukio Souri, Ishikawa (JP); Shuji Sakaguchi, Ishikawa (JP)

(73) Assignee: Daido Kogyo Co., Ltd., Ishikawa (JP)

( * ) Notice: Subject to any disclaimer, the term of this patent is extended or adjusted under 35 U.S.C. 154(b) by 146 days.

(21) Appl. No.: 11/705,024

(22) Filed: Feb. 12, 2007

(65) Prior Publication Data

US 2008/0041701 A1    Feb. 21, 2008

(30) Foreign Application Priority Data

Aug. 18, 2006   (JP) .............................. 2006-223192

(51) Int. Cl.
*B65G 17/12* (2006.01)
(52) U.S. Cl. ................ 198/487.1; 198/692; 198/803.12
(58) Field of Classification Search ............. 198/487.1, 198/692, 867.09, 803.13, 803.132
See application file for complete search history.

(56) References Cited

U.S. PATENT DOCUMENTS

| | | | | |
|---|---|---|---|---|
| 4,388,990 A | * | 6/1983 | Michalik | 198/867.15 |
| 4,880,108 A | * | 11/1989 | Burk | 198/803.12 |
| 4,927,002 A | * | 5/1990 | Springman | 198/487.1 |
| 5,232,083 A | * | 8/1993 | Motominami et al. | 198/803.12 |
| 5,542,526 A | * | 8/1996 | Wurgler | 198/803.7 |
| 5,562,198 A | * | 10/1996 | Koschig | 198/867.08 |
| 5,564,334 A | * | 10/1996 | Burke | 101/40 |

FOREIGN PATENT DOCUMENTS

JP        7-149417        6/1995

* cited by examiner

*Primary Examiner*—Mark A Deuble
(74) *Attorney, Agent, or Firm*—Wenderoth, Lind & Ponack, L.L.P.

(57) ABSTRACT

To provide a pin tip attachment structure that can engage a container with a bottom, such as a can or bottle, and convey the container without scratching it, a small diameter portion having a predetermined length is formed at a front end portion of a pin. A bushing is fitted in a lower end portion of a cylindrical hole of a pin tip having the cylindrical hole opened at a lower end side, and the bushing is vertically movably inserted onto the small diameter portion of the pin. A stopper portion for retaining the bushing is provided at a front end of the small diameter portion. A spring receiver portion is provided below the small diameter portion, and a coil spring is provided in a compressible manner between the spring receiver portion and the bushing or the lower end of the pin tip.

21 Claims, 6 Drawing Sheets

Fig. 10C PRIOR ART

PIN TIP ATTACHMENT STRUCTURE OF CONVEYOR CHAIN FOR CAN MAKING

BACKGROUND OF THE INVENTION

1. Field of the Invention

The present invention relates to a structure for stretching a pin of a chain and attaching a pin tip to an end of the pin, the chain being for engaging and conveying a container with a bottom, such as a can or bottle.

2. Related Art

Figure 9:
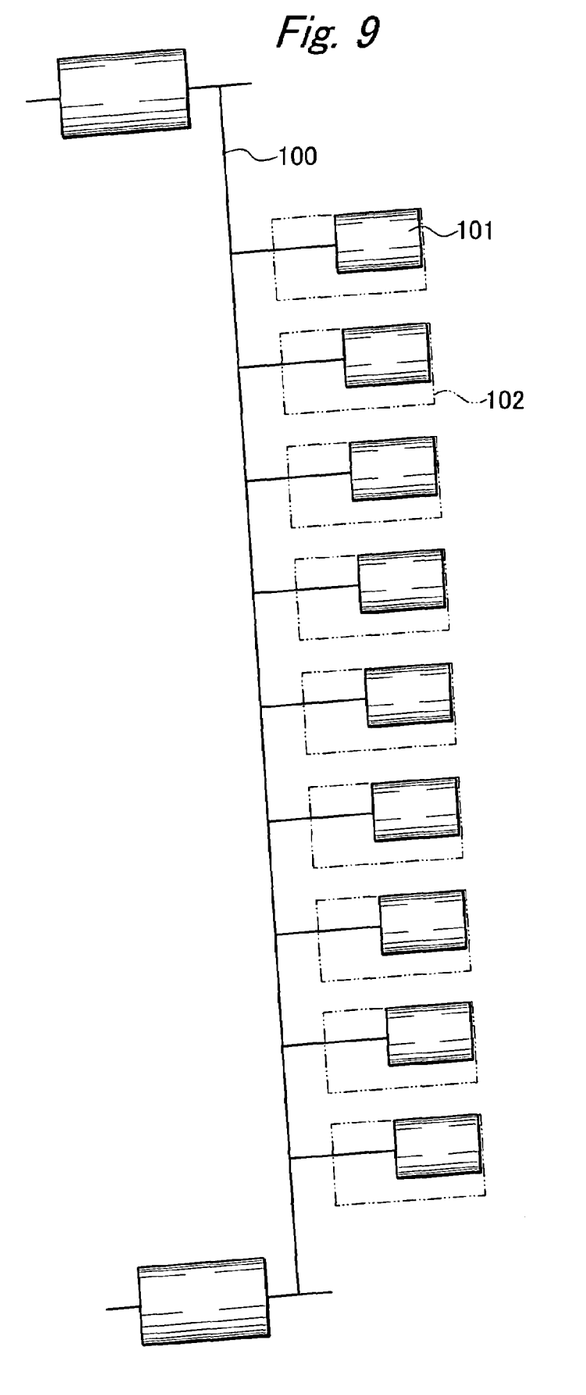
FIG. 9 shows a schematic plan view of a pin chain conveyor.

Recently, aluminum or steel cans have been often used for containers of drinks such as beer or juice. A large number of the cans are manufactured and bottled with drinks in factories. When the cans are manufactured, many steps such as a step of printing on an outer circumferential face, a step of drying, and a step of coating the inside are necessary. In each of the steps, the cans are conveyed by a pin chain conveyor. FIG. 9 shows aluminum cans 102 being conveyed while being engaged by pin tips 101 of a pin chain conveyor 100. Of course, steel cans are conveyed in the same way.

Speed of the aluminum cans 102 being conveyed while being engaged by the pin tips 101 of the pin chain conveyor 100 is extremely fast, about 200 m/min. Therefore, since the aluminum cans 102 engaged by the pin tips 101 are moving without rest, scratches are induced on the insides of the cans by rubbing of the cans with the pin tips 101. The scratches cause imperfect coating of the inside of the aluminum cans. As a result, corrosion is induced by bottled drinks, resulting in reduction in quality of the drinks bottled in the aluminum cans 102.

The "pin chain conveyor" disclosed in JP-A-7-149417 is configured to be able to prevent deformation of an open edge of a can. That is, a pin chain conveyor has a chain to be conveyed, pins projecting from the chain, pin tips to be attached to ends of the pins, the pin tips being reversely covered with cylinders having bottoms and having cylindrical outsides; wherein the pin tips are longer than the height of the cylinders having bottoms, and end portions at a chain side of the pin tips are formed in a taper shape having a tapered end. However, while the open edges of the cylinders engaged by such pin tips are not deformed while being conveyed, scratches cannot be prevented from being induced on the inside.

Figure 10A:
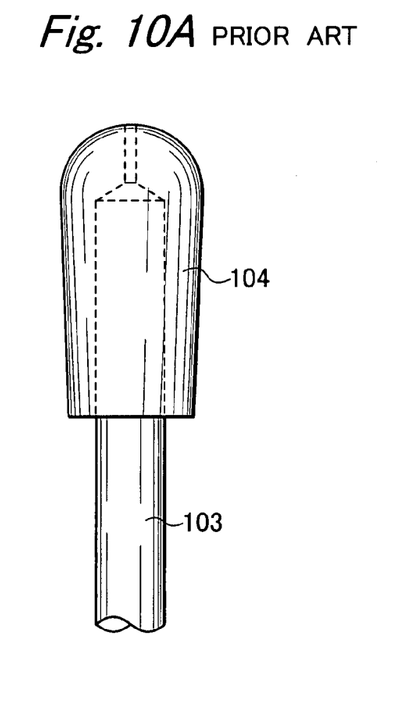
FIGS. 10A, 10B and 10C show plan views of conventional pin tip attachment structures.
Figure 10B:
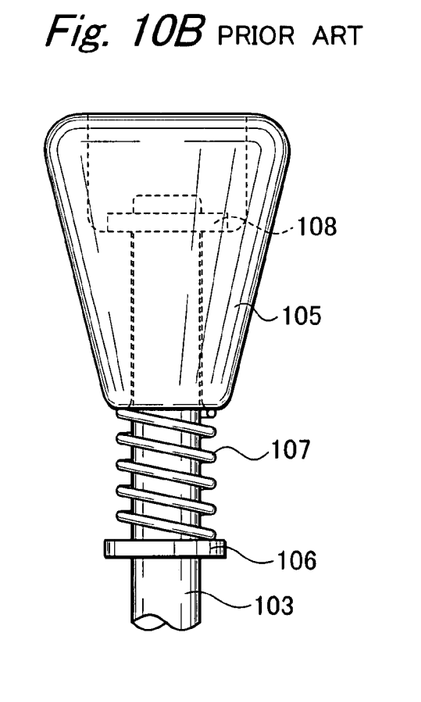
Figure 10C:
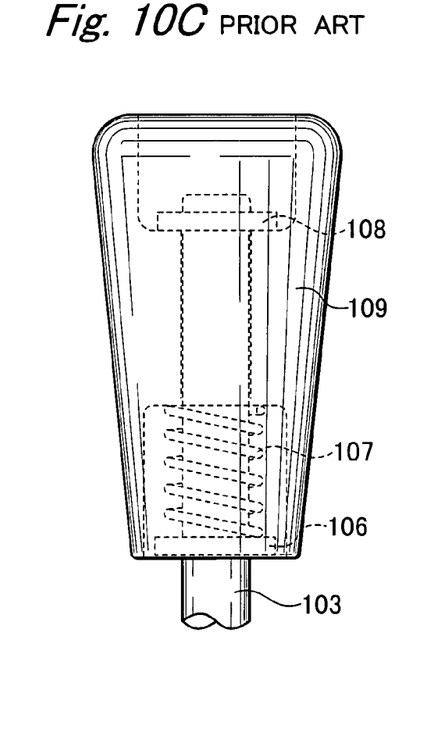

FIGS. 10A to 10C show a conventional attachment structure of a pin tip attached to a pin. A pin tip 104 shown in FIG. 10A has a small outer diameter size, and is directly pressed to fit with a pin 103. In some cases, a retention process is performed to prevent separation of the pin tip 104 from the pin 103.

A pin tip 105 shown in FIG. 10B has a reverse truncated cone shape, and is set on a coil spring 107 which is set on and supported by a ring plate 106 attached to the pin 103. A fixing tool 108 is attached to a front end of a pin such that the pin tip 105 is not separated from the pin 103. Accordingly, the pin tip 105 can be lowered while compressing the coil spring 107 when load is exerted from above, so that the aluminum can 102 being conveyed can be supported and conveyed without receiving an impact.

An attachment structure of a pin tip 109 shown in FIG. 10c is similar to that of FIG. 10B, except that the coil spring 107 and the ring plate 106, which support the pin tip 109, are configured to be accommodated in a recess formed at a lower end portion of the pin tip 109. Therefore, the structure has an appearance that the coil spring 107 and the ring plate 106 are not exposed outside of the pin tip 9.

If the pin tips 105 and 109 are supported by the coil spring 107 as shown in FIGS. 10B and 10C, when load is exerted, the coil spring 107 is compressed and deformed so that the pin tips 105 and 109 can slide and move downward along the pin 103, which prevents scratches from being induced on the inside of the aluminum can 102 being conveyed. However, such an attachment structure cannot be used for the pin tip 104 having a small size as shown in FIG. 10A. Therefore, there has been a difficulty that the large pin tip 105 or 109 as shown in FIG. 10B or 10C cannot be used for conveying a bottle or can having a small port, and consequently impact force is exerted between the pin tip and the aluminum can 102 being conveyed, causing scratches on the inside of the can.

SUMMARY OF THE INVENTION

It is desirable to provide a pin tip attachment structure of a chain for can making, which can support a pin tip via a coil spring even if the pin tip is a small pin tip that can support a container having a small port.

Thus, a pin tip attachment structure according to an embodiment of the invention is in a configuration where a small diameter portion having a predetermined length is formed at an end portion of a pin; a bushing is provided, the bushing being fitted in a lower end portion of a cylindrical hole of a pin tip having the cylindrical hole opened at a lower end side, and vertically movably inserted on the small diameter portion; a stopper stopper portion for retaining the bushing is provided at a front end of the small diameter portion; a spring receiver portion is provided below the small diameter portion; and a coil spring is provided in a compressible manner between the spring receiver portion and the bushing or the lower end of a pin tip.

According to such a configuration, since the pin tip is supported by the coil spring, and can be vertically moved with expansion and contraction of the coil spring within a range of the small diameter portion of the pin, when an upper end of the pin tip is pressed, the coil spring is compressed and is lowered. At that time, the bushing slides with the small diameter portion as a guide. Here, it is preferable that the cylindrical hole of the pin tip is made to have a step, and the lower end portion of the hole, which is to be fitted with the bushing, is made to have a slightly large diameter, and an upper side of the hole is made to have a smaller diameter for vertical movement of the stopper portion at a front end of the pin.

The bushing is preferably a bushing with a collar portion at a lower end because it is easily attached to the pin tip. Moreover, when a slit groove is formed in the bushing in a longitudinal direction so that inner diameter of a hole of the bushing can be expanded, even if the stopper portion is fixed, the bushing can override the stopper portion and can be inserted onto the small diameter portion of the pin.

The spring receiver portion can be a ring plate attached to the periphery of the pin, or may be formed by forming a receiver base using a step on the periphery of the pin.

The stopper portion can be formed by press fitting and fixing of a sleeve with respect to the pin, or can be formed by forming a screw thread at the front end of the pin and then screwing a nut with the thread. According to such a configuration, the stopper portion can be attached to the front end of the pin after attaching the bushing irrespective of a shape of the bush, and therefore assembly operation is facilitated.

The stopper portion may be a large diameter portion integrally formed with the pin, and in this case, a bushing having a slit groove formed in a longitudinal direction is used.

According to the pin tip attachment structure of the invention, since the pin tip can be supported while being set on the coil spring even if the pin tip is small, when a container is engaged by the pin tip, the coil spring is compressed and deformed and consequently an impact is mitigated even if the container has a small port, which eliminates scratches induced on the inside of a can or bottle.

On the other hand, for a can or bottle, it is extremely important to avoid adhesion of oils and fats because the can or bottle will contain drinks, and also when the oils and fats are adhered on the inside of the can or bottle, coating performance of paint becomes worse. However, the pin tip attachment structure of the invention is configured such that the pin is attached with the coil spring or the bushing, and the pin tip can be finally attached. Accordingly, the structure of the invention is advantageous in that the possibility of adhesion of oils and fats to the pin tip is extremely reduced, and consequently adhesion of oils and fats to the inside of a can or bottle is suppressed.

DETAILED DESCRIPTION OF THE PREFERRED EMBODIMENTS

Figure 1A:
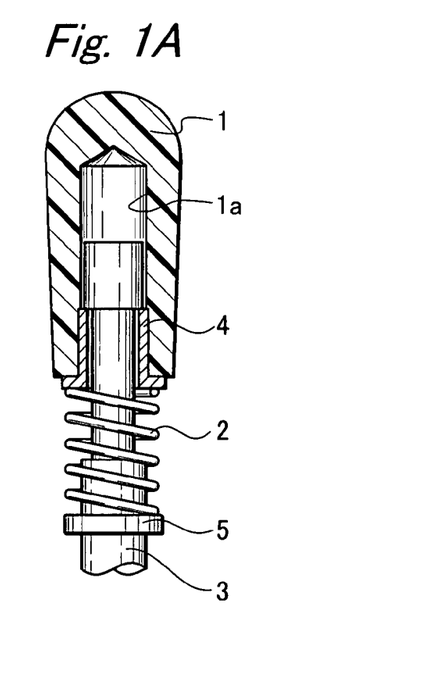
FIGS. 1A and 1B show vertical section views of a pin tip attachment structure according to a first embodiment of the invention, which represent a case that a pin tip is in a raised position and a case that it is in a lowered position respectively.
Figure 1B:
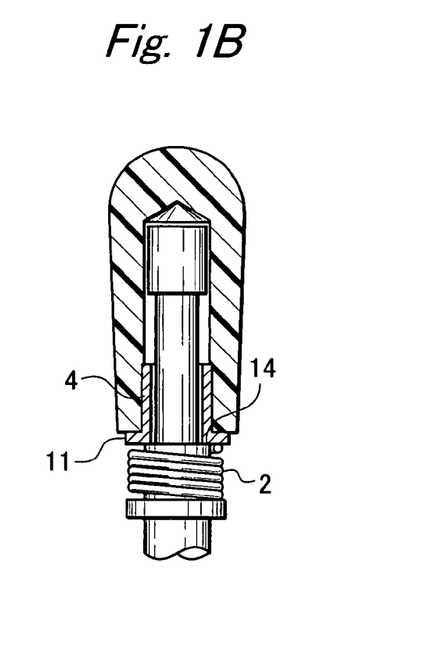

FIGS. 1A and 1B show a pin tip attachment structure according to a first embodiment of the invention, in which a reference 1 indicates a pin tip, reference 2 indicates a coil spring, reference 3 indicates a pin, reference 4 indicates a bushing with collar, and reference 5 indicates a ring plate, respectively. The pin tip 1 is attached to the pin 3 in a stretchable and contractible manner by the coil spring 2 mounted on the pin 3. FIG. 1A shows a case that the coil spring 2 is stretched and the pin tip 1 is therefore in a raised (or extended) position, and FIG. 1B shows a case that the coil spring 2 is compressed and deformed and the pin tip 1 is therefore in a lowered (or contracted) position.

Figure 2A:
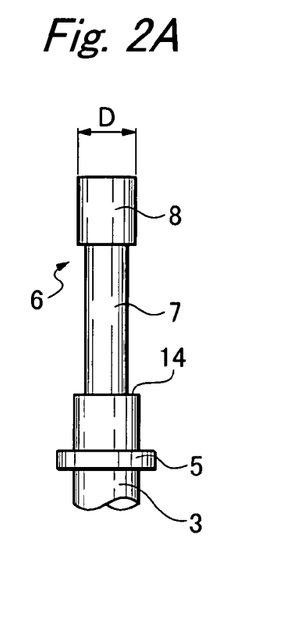
FIGS. 2A, 2B and 2C show vertical section views of a front-end portion of a pin to be attached with a pin tip in the structure, and a condition where a coil spring is attached to the end portion and a condition where a bushing with collar is attached to the end portion, respectively.
Figure 2B:
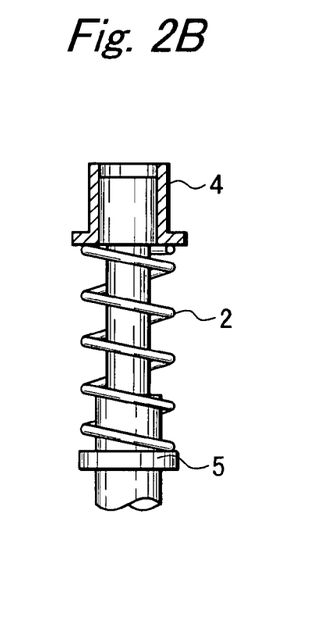

The pin tip 1 has a front end side formed in a semispherical shape, and has a cylindrical hole 1a opened at a lower end side in which the bushing 4 is fitted. At a front end portion 6 of the pin 3, a thinned small-diameter portion 7 is formed, and a large diameter portion 8 having the same size as size of the pin 3 is integrally formed with a front end of the pin, as shown in FIG. 2A. The ring plate 5 is attached to a lower side of the small-diameter portion 7, and as shown in FIG. 2B, the coil spring 2 is fitted over the front-end portion 6 of the pin and set on the ring plate 5. Then, as shown in FIG. 2C, the bushing 4 is attached with and retained by the large diameter portion 8 at the front end of the pin.

Figure 3A:
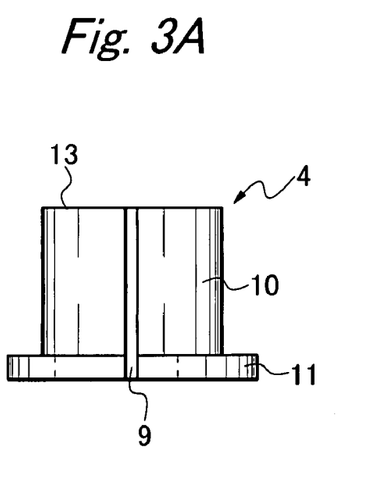
FIGS. 3A and 3B show a front view and a plan view of the bushing with collar, respectively.
Figure 3B:
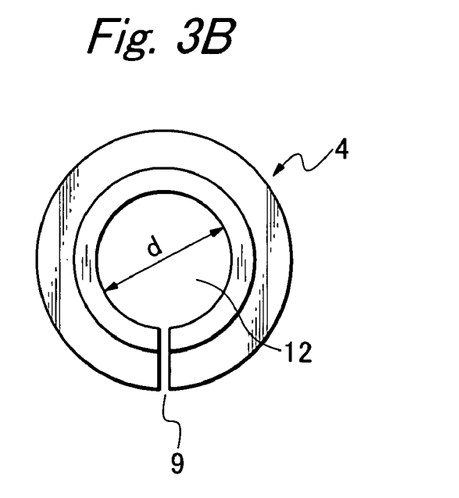

As shown in FIGS. 3A and 3B, the bushing 4 is in a configuration where a slit groove 9 is formed in a longitudinal direction, so that the inner diameter "d" of the bushing can be expanded. In the bushing 4, a collar portion 11 is formed at a lower end of a cylindrical bushing portion 10, and a hole 12 is formed in an axial direction through the center. To fit the bushing is on the pin 3, first, the large diameter portion 8 of the front end of the pin 3 is inserted into the hole 12, and at that time, the slit groove 9 is expanded by the large diameter portion 8 of the pin, such that the inner diameter "d" of the hole 12 is expanded to be at least the outer diameter "D" of the large diameter portion 8 of the pin (refer to FIG. 2B) and the bushing is fit on the large diameter portion 8.

Figure 2C:
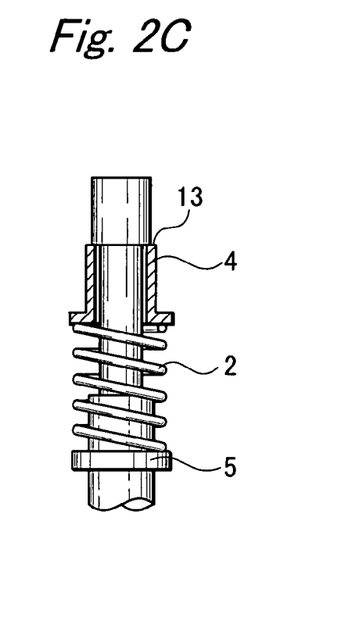

Next, when the bushing 4 engaged with the large diameter portion 8 is further pushed down, the bushing 4 is inserted over the small diameter portion 7 in the manner shown in FIG. 2C. At that time, the slit groove 9 that has been expanded by the large diameter portion 8 is returned to have an original width so that the inner diameter "d" of the bushing 4 becomes smaller than the outer diameter "D" of the large diameter portion 8. Then, the coil spring 2 is pinched between the ring plate 5 and the collar portion 11 and thus compressed. Therefore, the bushing 4 is urged upward at all times by the coil spring 2, and an upper end 13 of the bushing is seized against a lower end of the large diameter portion 8 of the pin. The bushing 4 that has been pushed down and fitted over the small diameter portion 7 is not disengaged because the inner diameter "D" of the hole 12 is smaller than the outer diameter "D" of the large diameter portion of the front end of the pin.

The bushing 4 fitted with the pin 3 in this way is fitted into a lower end of a cylindrical hole 1a of the pin tip 1, such that the pin tip 1 is attached to the pin 3 (FIG. 1A). Then, when the pin tip 1 is pressed, the coil spring 2 is compressed and deformed, such that the pin tip 1 is lowered, and the collar portion 11 of the bushing 4 is contacted against a base 14 using a step formed at a lower side of the small diameter portion 7 of the pin 3, such that the pin tip 1 is stopped (refer to FIG. 1B). When pressing force is released, the coil spring 2 is expanded and the pin tip 1 is raised as shown in FIG. 1A.

Figure 4A:
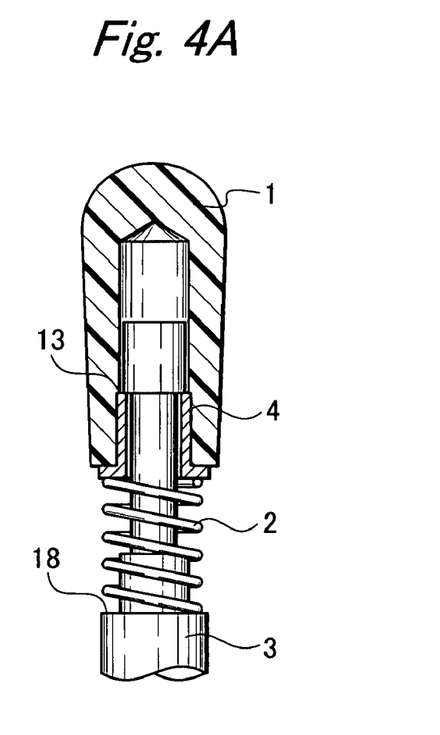
FIGS. 4A and 4B show vertical section views of a pin tip attachment structure according to a second embodiment of the invention, which represent a case that a pin tip is in a raised position and a case that it is in a lowered position respectively.
Figure 4B:
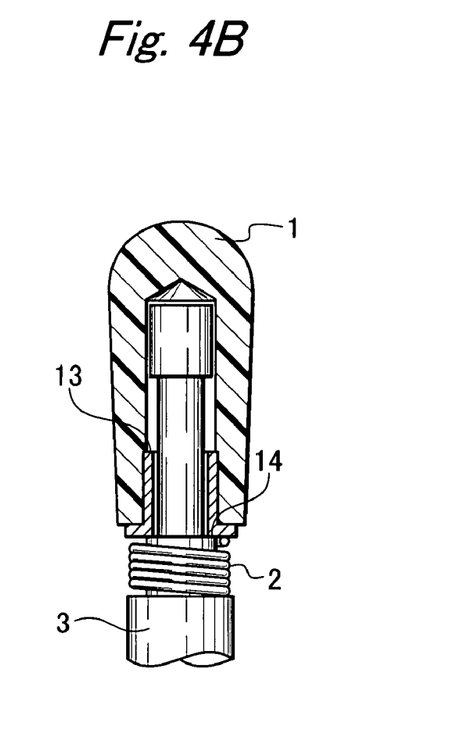

FIGS. 4A and 4B show a pin tip attachment structure according to a second embodiment of the invention. While the basic structure is the same as the first embodiment, the pin 3 does not have the ring plate 5. Instead, a receiver base 18 for receiving the coil spring 2 is formed on the pin 3, and the coil spring 2 rests on the receiver base 18, and elastically supports the pin tip 1. FIG. 4A shows a case that the coil spring 2 is extended and thus the pin tip 1 is in a raised position, and FIG. 4B shows a case that the coil spring 2 is compressed and deformed and thus the pin tip 1 is in a lowered position.

Figure 5A:
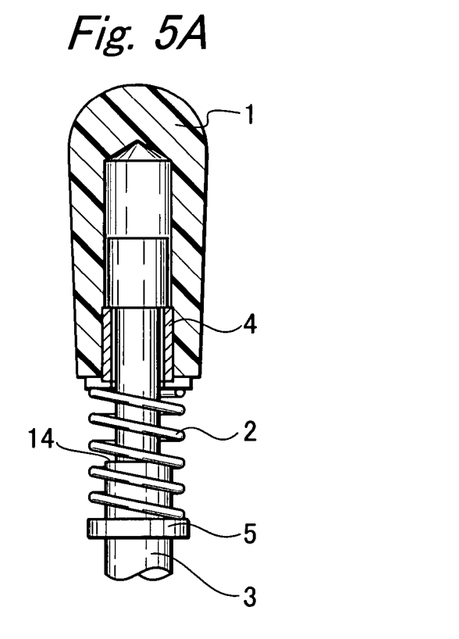
FIGS. 5A and 5B show vertical section views of a pin tip attachment structure according to a third embodiment of the invention, which represent a case that a pin tip is in a raised position and a case that it is in a lowered position respectively.
Figure 5B:
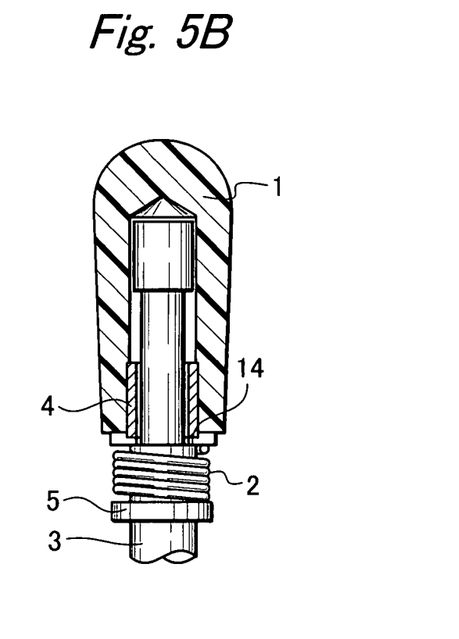

FIGS. 5A and 5B show a pin tip attachment structure according to a third embodiment of the invention. While a basic structure is the same as in the case of the first embodiment, the structure is different in that the bushing 4 is configured by separate pieces including a bushing part and a collar part. That is, the bushing 4 is configured with a lower end of the bushing part fitted in a concave portion provided in a top of the collar part. FIG. 5A shows a case that the coil spring 2 is extended and thus the pin tip 1 is in a raised position, and FIG. 5B shows a case that the coil spring 2 is compressed and deformed and thus the pin tip 1 is in a lowered position.

Figure 6A:
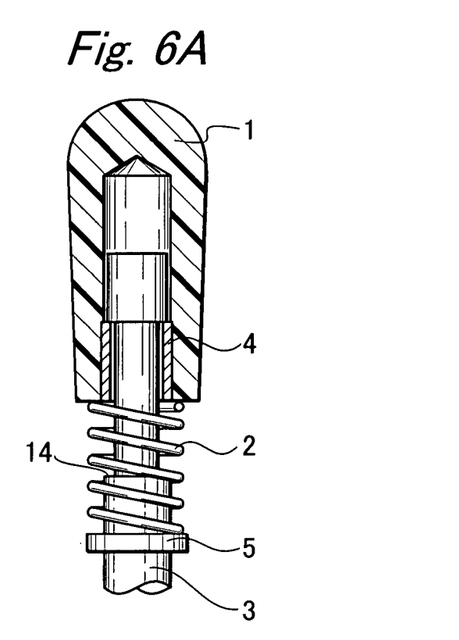
FIGS. 6A and 6B show vertical section views of a pin tip attachment structure according to a fourth embodiment of the invention, which represent a case that a pin tip is in a raised position and a case that it is in a lowered position respectively.
Figure 6B:
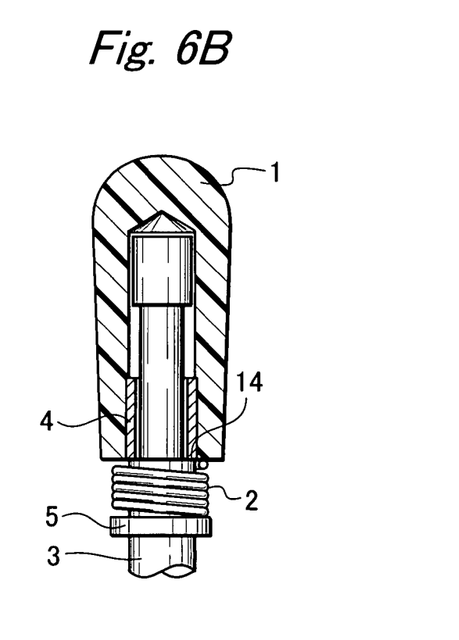

FIGS. 6A and 6B show a pin tip attachment structure according to a fourth embodiment of the invention. While the basic structure is the same as the first embodiment, the structure is different in that a bushing 19 to be fitted into the hole of the pin tip 1 is configured to have only the bushing part without a collar part. Here, the upper end of the coil spring 2 directly contacts against the lower end of the pin tip 1 to support the pin tip 1. FIG. 6A shows a case that the coil spring 2 is extended and thus the pin tip 1 is in a raised position, and FIG. 6B shows a case that the coil spring 2 is compressed and deformed and thus the pin tip 1 is in a lowered position.

Figure 7A:
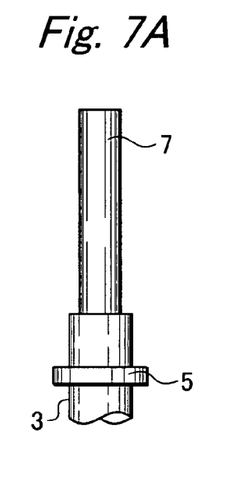
FIGS. 7A, 7B and 7C show vertical section views of a different embodiment of the front end portion of the pin, which represent the front end portion of the pin to be attached with a pin tip, a condition where a coil spring is attached to the front end portion, and a condition where a bushing with collar is attached to the front end portion, respectively.
Figure 7B:
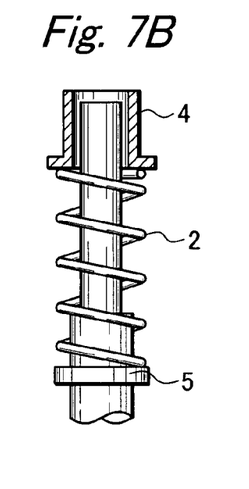
Figure 7C:
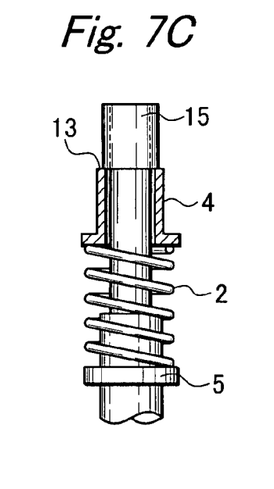

As shown in FIGS. 7A to 7C, the pin 3 can be attached with a sleeve configured by a separate component, without having the large diameter portion 8 (refer to FIG. 2A) integrally formed at the front-end portion. That is, as shown in FIG. 7A, the large diameter portion is not integrally formed at the front end of the pin, and a small diameter portion 7 extending to the front end is formed; and the coil spring 2 is set on the ring plate 5 attached to a lower side of the small diameter portion 7, and the bushing 4 is set on the coil spring 2 (FIG. 7B); then the bushing 4 is pushed down to compress and deform the coil spring 2, so that a sleeve 15 is pressed and fitted on the front end of the small diameter portion 7 (FIG. 7C). Here, the outer diameter of the sleeve 15 is made to be the same as outer diameter of the large diameter portion 8, so that the upper end 13 of the bushing 4 contacts against a lower end of the sleeve 15 for retention. By using such a configuration, the bushing 4 need not have the slit groove.

It is obvious that the outer diameter of the sleeve 15 need not be made to be the same as the outer diameter of the large diameter portion 8, so long as it is larger than the inner diameter "d" of the hole 12 of the bushing 4. The bushing 4, which is configured so that it does not disengage from the pin after press fitting of the sleeve 15, is then attached with the pin tip 1, resulting in the same configuration as in the first embodiment. Alliteratively, instead of the sleeve 15, a nut may be screwed onto the pin. That is, when a screw thread portion is formed on the front end of the small diameter portion 7, and the nut is screwed onto the screw thread portion, the bushing 4 contacts against the nut and thus is not disengaged.

Figure 8A:
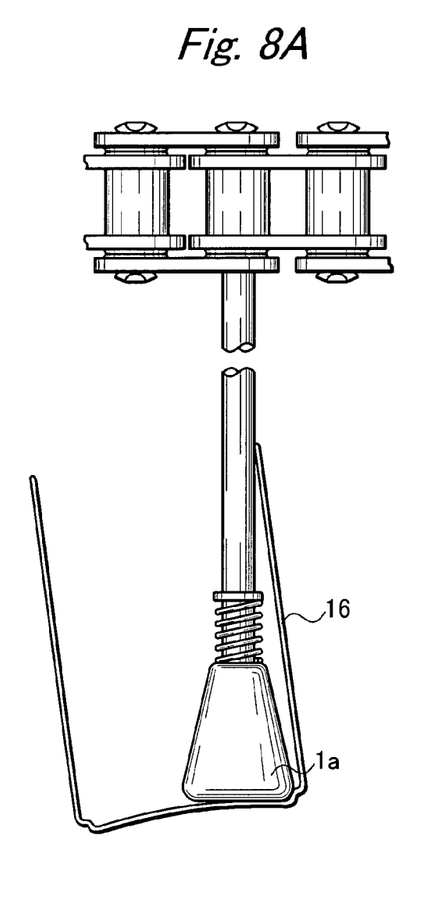
FIGS. 8A and 8B show plan views of a condition where the pin tip seizes an aluminum can, and a condition where it seizes an aluminum bottle, using partial cross sections, respectively.
Figure 8B:
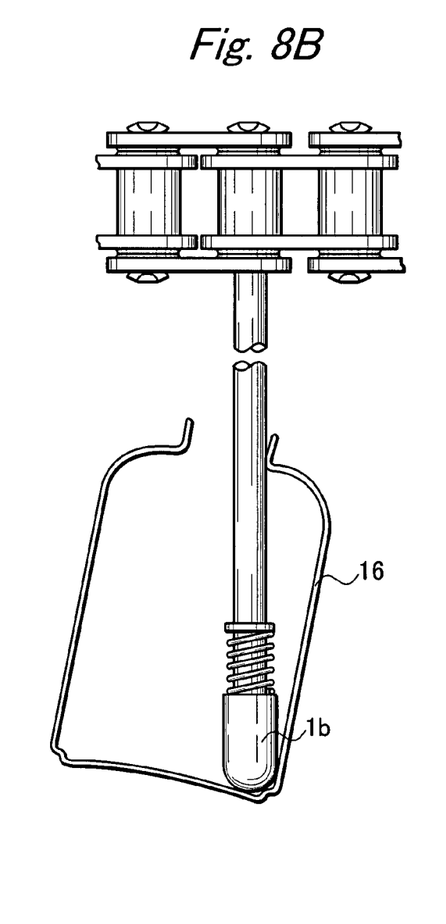

FIG. 8A shows a case that one aluminum can 16 is engaged by a pin tip 1a, and FIG. 8B shows a case that one aluminum bottle 17 is engaged by a pin tip 1b. The pin tip attachment structure of an embodiment of the invention can be used for conveying a container in a shape having a small port such as the aluminum bottle 17 shown in FIG. 8B, since the structure is configured to be usable even in the case that the pin tip 1 has a small diameter. However, the pin tip 1a having a large diameter as shown in FIG. 8A can be obviously attached by using the same structure.

What is claimed is:

1. An attachment structure for attaching a pin tip to a conveyor chain of a conveyor, wherein the pin tip is for engaging a closed-bottom container to be conveyed by the conveyor, and wherein the pin tip has a cylindrical hole therein closed at a distal end of the pin tip and open at a proximal end of the pin tip, said attachment structure comprising:
   a bushing having a cylindrical portion and a collar portion extending radially from said cylindrical portion, said cylindrical portion being configured for insertion in the cylindrical hole at the proximal end of the pin tip; and
   an elongated pin having,
      at a distal end thereof, a large-diameter portion configured to be slidably received in the cylindrical hole of the pin tip so as to be axially movable in the cylindrical hole, said large-diameter portion having a proximal shoulder at a proximal end thereof,
      a small-diameter portion smaller in diameter than said large-diameter portion and extending coaxially from a proximal end of said large-diameter portion,
      a proximal portion having a diameter larger than the diameter of the small-diameter portion and extending coaxially from a proximal end of said small-diameter portion, said proximal portion having a distal shoulder at a distal end thereof, and
      a spring receiver portion extending radially outwardly from said proximal portion;
   wherein said cylindrical portion of said bushing has an inner diameter smaller than an outer diameter of said large-diameter portion of said elongated pin such that said large-diameter portion of said elongated pin constitutes a stopper portion for preventing said bushing from coming off the distal end of said elongated pin;
   wherein said bushing is slidably fitted on said small-diameter portion of said elongated pin so as to be slidable between said proximal shoulder of said large-diameter portion and said distal shoulder of said proximal portion;
   wherein a coil spring is disposed about said elongated pin between said spring receiving portion thereof and said collar portion of said bushing so as to abut against said spring receiving portion and urge said bushing toward the proximal shoulder of said large-diameter portion of said elongated pin, and such that, when a force acts on said bushing in a direction toward the proximal end of said elongated pin, said bushing is moved relative to said elongated pin toward said distal shoulder of said proximal portion against an urging force of said coil spring and, when the force is released, said bushing is moved back toward said proximal shoulder of said large-diameter portion of said elongated pin by the urging force of said coil spring; and
   wherein said elongated pin is constituted by a chain link pin configured to connect link plates of the conveyor chain.

2. The attachment structure according to claim 1, wherein said spring receiver portion comprises a ring plate attached to a periphery of said elongated pin.

3. The attachment structure according to claim 2, wherein said bushing has a slit groove formed therein along an axial direction thereof so as to allow said inner diameter of said cylindrical portion of said bushing to be expanded.

4. The attachment structure according to claim 1, wherein said spring receiver portion is constituted by a step portion formed on a periphery of said elongated pin.

5. The attachment structure according to claim 4, wherein said bushing has a slit groove formed therein along an axial direction thereof so as to allow said inner diameter of said cylindrical portion of said bushing to be expanded.

6. The attachment structure according to claim 1, wherein said large-diameter portion of said elongated pin is constituted by a separate member secured to a distal end of said small-diameter portion of said elongated pin.

7. The attachment structure according to claim 6, wherein said separate member comprises a sleeve press fitted on said distal end of said small-diameter portion.

8. The attachment structure according to claim 1, wherein said large-diameter portion of said elongated pin is formed integrally with said small-diameter portion of said elongated pin.

9. The attachment structure according to claim 8, wherein said bushing has a slit groove formed therein along an axial direction thereof so as to allow said inner diameter of said cylindrical portion of said bushing to be expanded.

10. The attachment structure according to claim 1, further comprising
chain link plates, said chain link pin being coupled to said chain link plates to connect said chain link plates together.

11. An attachment structure for use in engaging a closed-bottom container to be conveyed by a conveyor chain of a conveyor, said attachment structure comprising:
pin tip having a cylindrical hole therein closed at a distal end of said pin tip and open at a proximal end of said pin tip;
a bushing having a cylindrical portion and a collar portion extending radially from said cylindrical portion, said cylindrical portion being configured for insertion in said cylindrical hole at said proximal end of said pin tip; and
an elongated pin having,
at a distal end thereof, a large-diameter portion configured to be slidably received in said cylindrical hole of said pin tip so as to be axially movable in said cylindrical hole, said large-diameter portion having a proximal shoulder at a proximal end thereof,
a small-diameter portion smaller in diameter than said large-diameter portion and extending coaxially from a proximal end of said large-diameter portion,
a proximal portion having a diameter larger than the diameter of the small-diameter portion and extending coaxially from a proximal end of said small-diameter portion, said proximal portion having a distal shoulder at a distal end thereof, and
a spring receiver portion extending radially outwardly from said proximal portion;
wherein said cylindrical portion of said bushing has an inner diameter smaller than an outer diameter of said large-diameter portion of said elongated pin such that said large-diameter portion of said elongated pin constitutes a stopper portion for preventing said bushing from coming off the distal end of said elongated pin;
wherein said bushing is slidably fitted on said small-diameter portion of said elongated pin so as to be slidable between said proximal shoulder of said large-diameter portion and said distal shoulder of said proximal portion;
wherein a coil spring is disposed about said elongated pin between said spring receiving portion thereof and said collar portion of said bushing so as to abut against said spring receiving portion and urge said bushing toward the proximal shoulder of said large-diameter portion of said elongated pin, and such that, when a force acts on said pin tip in a direction toward the proximal end of said elongated pin, said pin tip and said bushing are moved relative to said elongated pin toward said distal shoulder of said proximal portion against an urging force of said coil spring and, when the force is released, said pin tip and said bushing are moved back toward said proximal shoulder of said large-diameter portion of said elongated pin by the urging force of said coil spring.

12. The attachment structure according to claim 11, wherein
said spring receiver portion comprises a ring plate attached to a periphery of said elongated pin.

13. The attachment structure according to claim 12, wherein
said bushing has a slit groove formed therein along an axial direction thereof so as to allow said inner diameter of said cylindrical portion of said bushing to be expanded.

14. The attachment structure according to claim 11, wherein
said spring receiver portion is constituted by a step portion formed on a periphery of said elongated pin.

15. The attachment structure according to claim 14, wherein
said bushing has a slit groove formed therein along an axial direction thereof so as to allow said inner diameter of said cylindrical portion of said bushing to be expanded.

16. The attachment structure according to claim 11, wherein
said large-diameter portion of said elongated pin is constituted by a separate member secured to a distal end of said small-diameter portion of said elongated pin.

17. The attachment structure according to claim 16, wherein
said separate member comprises a sleeve press fitted on said distal end of said small-diameter portion.

18. The attachment structure according to claim 11, wherein
said large-diameter portion of said elongated pin is formed integrally with said small-diameter portion of said elongated pin.

19. The attachment structure according to claim 18, wherein
said bushing has a slit groove formed therein along an axial direction thereof so as to allow said inner diameter of said cylindrical portion of said bushing to be expanded.

20. The attachment structure according to claim 11, wherein said elongated pin is constituted by a chain link pin configured to connect link plates of the conveyor chain.

21. The attachment structure according to claim 20, further comprising
chain link plates, said chain link pin being coupled to said chain link plates to connect said chain link plates together.

* * * * *